United States Patent [19]

Butler

[11] Patent Number: 4,980,134
[45] Date of Patent: Dec. 25, 1990

[54] LEACHING PROCESS

[75] Inventor: Dean Butler, Hahndorf, Australia

[73] Assignees: Action Gold Development Ltd.; Accel Industrial and Mineral Processes Ltd., both of Melbourne, Australia

[21] Appl. No.: 905,690

[22] Filed: Sep. 9, 1986

[30] Foreign Application Priority Data

Sep. 10, 1985 [AU] Australia .............................. PH02367

[51] Int. Cl.$^5$ ........................... B01G 5/00; B01G 7/00; B01G 55/00
[52] U.S. Cl. ........................................ 423/27; 75/744; 204/109; 204/110
[58] Field of Search ................. 75/101 R, 118 R, 743, 75/744; 423/27; 204/109, 110

[56] References Cited

U.S. PATENT DOCUMENTS

| | | | |
|---|---|---|---|
| 2,761,829 | 9/1956 | Dolloff | 204/114 |
| 3,957,601 | 5/1976 | Drinkard, Jr. | 204/105 R |
| 4,071,278 | 1/1978 | Carpenter | 209/5 |
| 4,128,462 | 12/1978 | Ghiringhelli et al. | 204/109 |
| 4,139,432 | 2/1979 | Ghiringhelli et al. | 204/110 |
| 4,204,922 | 5/1980 | Fraser et al. | 204/109 |
| 4,206,024 | 6/1980 | Carpenter | 204/130 |
| 4,561,947 | 12/1985 | Schulze | 75/118 R |

FOREIGN PATENT DOCUMENTS 8400563 2/1984 PCT Int'l Appl. .

OTHER PUBLICATIONS

Shepherdson, Cecil Bingham, Austrialian Patent Specification "Recovery of Gold from Gold Bearing Material" AU-A-25349/84 (3/2/84).

"Improvement in Hydrometallurgical Processes Due to Electrohydraulic Treatment" by T. L. Inyushkina, Tsvetnk Met 3:15-17 (1980), and English Translation.

Primary Examiner—Jeffrey E. Russel
Assistant Examiner—R. Bruce Breneman
Attorney, Agent, or Firm—Alexis Barron

[57] ABSTRACT

Noble metals, particularly gold, are recovered from ores by a leaching process in which a slurry of ground ore containing an oxidant and a lixiviant for dissolving the noble metal is subjected to an alternating electric field which accelerates and promotes the dissolution of the noble metal.

22 Claims, 3 Drawing Sheets

A—INCREASE IN RATE WITH INCREASING CONCENT. OF DICHROMATE.

B—1% DICHROMATE AT 20 VOLTS WITH NO AGITATION.

C—0.3% HYPOCHLORITE AT 20 VOLTS WITH NO AGITATION

D—0.1% DICHROMATE AT 20 VOLTS WITH NO AGITATION

LEACHING PROCESS

This invention relates to an improved method of recovering metals from ore.

FIELD OF THE INVENTION

Leaching processes for the recovery of metals are known and find particular application in the recovery of gold. The chloride and cyanide leaching processes for gold recovery involve an initial oxidation of the gold to a higher oxidation state and then the formation of a complex anion with chloride or cyanide ions which take the gold into solution. The gold is then recovered from solution.

In the chloride process the presence of chlorine gas ($Cl_2$) in solution with the ore results in oxidation of the gold $$Au \xrightarrow{Cl_2} Au^{+++}$$

The presence of chloride ions results in a soluble complex anion $$4Cl^- + Au^{+++} \rightarrow AuCl_4^-$$

This chloride process had a number of disadvantages namely the evolution of the poisonous gas chlorine and the need for low pH which is a corrosive environment of high acid consumption. With the cyanide process, a lower oxidation potential is required and this can be provided by bubbling air through the solution $$Au \xrightarrow{oxidation} Au^+$$

to form the soluble cyanide complex $$Au^+ + 2CN^- \rightarrow Au(CN)_2^-$$

The chloride process requires a low pH which is corrosive to most reaction vessels. The cyanide process involves a higher pH which avoids corrosion problems.

The solution rates for the cyanide process are relatively low in that leaching rates of the order of 10% by weight per hour are typical.

REPORTED DEVELOPMENTS

In recent years a number of other processes for the leaching of metals particularly gold have been suggested using electrolytic cells. Dextec Metallurgical Pty. Ltd. in Australian patent application No. 17789/83 disclose a method and a cell construction for dissolving silver and gold ores in a strong chloride solution by maintaining the oxidation potential (Eh) above 750 mV. The process is conducted in an electro chemical D.C. diaphragm cell. In one embodiment a sodium chloride solution and a silver containing ore are treated in an electrolytic cell wherein an oxidation potential above 850 mV is maintained. The cell includes a membrane between the anode and cathode. Current is passed for a sufficient period during the residence time to maintain the required oxidation potential by the liberation of chlorine. The disclosed example provided a leaching rate of about 20% per hour.

Another proposal is contained in Australian patent specification No. 25349/84 by Shepherdson Building Pty. Ltd. It is claimed that gold can be removed from gold bearing material by agitation of the material in an electrically conductive solution while subjecting the mixture to electrolyte action using D.C. or A.C. current. It is claimed that the gold enters solution and can be removed by conventional techniques such as the use of activated carbon. No leaching or recovery rates are disclosed but the process is explained as involving the deionizing of the calcine pulp to enable release of the gold into solution.

SUMMARY OF THE INVENTION

The present invention has as its object the improvement of known leaching processes particularly to increase leaching rates.

To this end the present invention provides a method of dissolving noble metal values present in an ore comprising forming a slurry of the ore and subjecting the slurry to an alternating electric field in the presence of an oxidizing agent and a lixiviant which assists in dissolving the noble metal.

This process finds particular application in the recovery of gold, silver and platinum values. The present invention is applicable to improving the recovery of gold by adapting the chloride or thiourea leaching processes.

The presence of an oxidizing agent in combination with an alternating electric field apparently ensures that the oxidation state of the gold is raised to enable the formation of a soluble complex with a suitable lixiviant. Where the chloride ion is present, it acts as a lixiviant and the gold enters solution as a chloride complex.

An explanation of why this invention is able to achieve high rates of extraction and dissolution is not available because the mechanism is not understood. However, tests have shown that the presence of an oxidizing agent alone provides negligible or insignificant yields which are dramatically improved once an alternating electric field is applied.

It is preferred to grind the ore to expose the noble metal surfaces otherwise dissolution cannot occur. It appears that dissolution occurs from surfaces at right angles to the electric field and not on surfaces parallel to the field. In the absence of a lixiviant which is usually an anion, although it may be a ligand, the gold tends to redeposit and does not enter solution.

In order to reduce the need for chemical addition to the leaching solution, it is preferred to select oxidizing agents and lixiviants which in solution have a pH of the same order as the noble metal containing ore.

Suitable oxidizing agents need not have a high redox value as long as they are electron acceptors. Higher oxidation potentials do tend to increase the leaching rate. As long as the oxidant acts as an oxidizing agent in the process conditions it is acceptable. Oxidizing agents may be selected from sodium hypochlorite, ammonium chloride, ferric chloride, ammonium hydroxide and copper sulphate or other similar oxidants. Some of these compounds are normally considered as weak oxidants but are effective in this process.

Suitable lixiviants are obtained by adding to the slurry compounds selected from sodium chloride, ammonium chloride, ammonium thiocyanate, sodium cyanide, sodium thiosulfate and thiourea. Any compound which acts to form a soluble complex with the noble metal is suitable.

In some cases the oxidant and lixiviant may be the same compound and ammonium chloride and ferric ammonium citrate are examples.

In general the minimum concentration levels for the oxidant and lixiviant are 0.1% by weight of the slurry for strong oxidants and lixiviants that form very soluble noble metal complexes and 1% for lesser oxidants and lixiviants.

The selection of an oxidant-lixiviant combination needs to be made for each ore type to obtain optimum conditions and lowest recovery costs. Of necessity the lixiviant selected must be stable both in the presence of the oxidant selected and in the pH range to be used.

Electric field strength in volts per centimeter affects the leaching rate. There appears to be a minimum strength (or for a particular cell, a minimum voltage) below which the process does not proceed at an accelerated rate. Generally this appears to be a field strength of 1 volt per centimeter. However, above this threshold level leaching rate increases with increasing field strength.

With this invention initial leaching rates of finely divided ore of above 95% per minute or better can be achieved. This compares with the standard extraction rate in the cyanide process of 0.06 mg per hour from a gold test bead with 0.1% NaCN at pH 10 or complete dissolution of all cyanide soluble gold within 4 hours.

In designing a suitable cell to carry out this invention, attention must be paid to power consumption and the fact that field strength is dependent on the distance between the electrodes. The width and depth of the electrodes in the cell will affect the current and the ultimate power consumption. However the electrode spacing will be determined by the optimum field strength and the desired operating voltage.

Power consumption in a cell of fixed voltage will increase with increasing current. Current increases with decreasing pH below 7, decreasing solids content and increasing ion concentration.

Thus having a high solids content is generally desirable.

If the leaching conditions being used permit it pH levels approaching 7 and low electrolyte concentrations are preferred as these provide a lower power consumption. The reaction rate may be lowered because of the higher pH or lower electrolyte concentration but the saving in power consumption may justify the slower reaction rate which is still much faster than in the absence of the alternating electric field.

The frequency of the alternating electric field does not appear to be critical except that a minimum frequency about 3 cycles per second is required in order to obtain an increase in the dissolution rate. For a given voltage, dissolution rates generally increase with increasing frequency and then level out with higher frequency. It appears that for a particular ore that an optimum frequency will exist. By selecting a suitable voltage and frequency optimum, yield for a given power consumption can be obtained.

Preferred embodiments of the invention will now be described.

PREFERRED EMBODIMENTS

Figure 1:
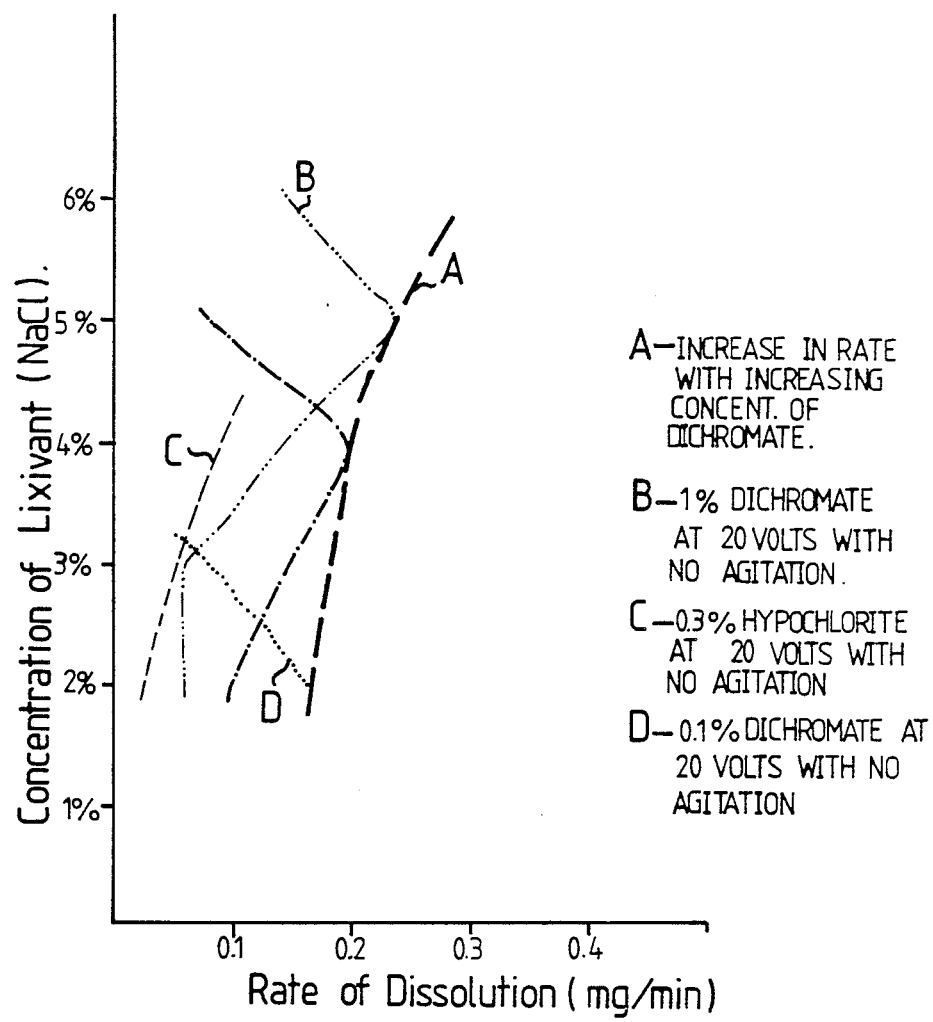
FIGS. 1 and 2 of the drawings are graphical representations of the results of tests described in examples 16 and 17 below.

Preferred embodiments of the invention will now be described.

Ore to be processed is fed from hopper 5 by conveyor 6 to a jaw crusher 7. Crushed ore is conveyed to a vibrating screen 8 which separates material above 5 mm and returns it via conveyor 9 to the jaw crusher 7. The fine material is passed to the fine ore bin 10 and then via conveyor 11 to a ball mill 12 where it is mixed with recirculating liquor to form a slurry. The material from the ball mill 12 is passed to the screen 13 where the fine materials conveyed to a gravity circuit provide a slurry feed through the continuous flow electrochemical cell 15. The cell is operated with an alternating current and electric field according to this invention. Residence times in the cell are determined for a particular ore on the required recovery rate. The treated slurry with the noble metal in solution is passed from cell 15 to the belt filter 16 and the retained material is conveyed by line 17 to waste. The pregnant liquor 18 is passed to ionic resin absorption columns 19 to remove the noble metal and the liquor is recycled to the ball mill 12.

The invention will now be further described with reference to examples.

These examples were conducted with a 2 mm diameter gold bead suspended in an electrolytic cell and the weight loss of the bead is measured. Gold in ores is generally in a finely divided form and because the dissolution reaction is related to available surface area it has been shown that weight loss rates of typically 100 times those observed with the gold bead are achievable with gold ores. N.B. all oxidation potentials are referenced to standard hydrogen electrode.

Example 1

Leach Solution - 3 g/L NaClO, 40 g/L NaCl, pH 7.4
Oxidation Potential (m.v.) 808, Voltage 16.8, Amperes 4.1
Field Strength 4.2 v/cm. Temperature 25° C., Agitation used.
Rate of Gold Dissolution 0.23 mg/minute.

Example 2

Leach Solution - 3 g/L NaClO, 40 g/L NaCl, pH 11.1
Oxidation Potential (m.v.) 553, Voltage 18.5, Amperes 3.0
Field Strength 4.6 v/cm. Temperature 25° C., Agitation used.
Rate of Gold Dissolution 0.08 mg/minute.

Example 3

Leach Solution - 10 g/L NH$_4$Cl, 40 g/L NaCl, pH 3.0
Oxidation Potential (m.v.) 509 Voltage 13.9, Amperes 5.0
Field Strength 3.5 v/cm. Temperature 25° C., Agitation used.
Rate of Gold Dissolution 0.06 mg/minute.

Example 4

Leach Solution - 10 g/L NH$_4$Cl, 40 g/L NaCl, pH 6.7
Oxidation Potential (m.v.) 341, Voltage 18.5, Amperes 4.5
Field Strength 4.6 v/cm. Temperature 25° C., Agitation used.
Rate of Gold Dissolution 0.06 mg/minute.

Example 5

Leach Solution - 10 g/L NH$_4$Cl, 40 g/L NaCl, pH 7.9
Oxidation Potential (m.v.) 154, Voltage 18.2, Amperes 4.2
Field Strength 4.5 v/cm. Temperature 25° C., Agitation used.
Rate of Gold Dissolution 0.03 mg/minute.

Example 6

Leach Solution - 20 g/L FeCl$_3$, 10 g/L NaCl, 10 g/L NH$_4$SCN, pH 1.6
Oxidation Potential (m.v.) 492, Voltage 21, Amperes 2.0
Field Strength 5.2 v/cm. Temperature 25° C., Agitation used.
Rate of Gold Dissolution 0.06 mg/minute.

Example 7

Leach Solution - 20 g/L FeCl$_3$, 10 g 1 NaCl, 10 g/L NH$_4$Cl, 10 g/L NH$_4$ SCN
Oxidation Potential 490, Voltage 15.8, Amperes 3.5 pH 1.6
Field Strength 4.0 v/cm. Temperature 25° C., Agitation used.
Rate of Gold Dissolution 0.11 mg/minute.

Example 8

Leach Solution - 20 g/L FeCl$_3$, 10 g/L (NH$_2$)$_2$ CS
Oxidation Potential 499, Voltage 16.6, Amperes 1.5 pH 1.5
Field Strength 4.1 v/cm. Temperature 25° C., Agitation used.
Rate of Gold Dissolution 0.21 mg/minute.
This example demonstrates the effect of thiourea in acting as a ligand to take the gold into solution in a cationic state. Less power is consumed in achieving the leaching rate of this Example than in Example 1.

Example 9

Leach Solution - 10 g/L NH$_4$Cl, 10 g/L NaCN,
Oxidation Potential 340, Voltage 18.3, Amperes 1.6 pH 9.3
Field Strength 4.6 v/cm. Temperature 25° C., Agitation used.
Rate of Gold Dissolution 0.05 mg/minute.

Example 10

Leach Solution - 10 g/L NH$_4$Cl, 1 g/L NaCl, 10 g/L NaCN
Oxidation Potential 340, Voltage 18.6, Amperes 1.8 pH 9.3
Field Strength 4.6 v/cm. Temperature 25° C., Agitation used.
Rate of Gold Dissolution 0.09 mg/minute.

Example 11

Leach Solution - 10 g/L Saturated NH$_4$OH Solution, 10 g/L NaCN
Oxidation Potential 361, Voltage 19.2 Amperes 0.96 pH 11.1
Field Strength 4.8 v/cm. Temperature 25° C., Agitation used.
Rate of Gold Dissolution 0.06 mg/minute.

Example 12

Leach Solution - 10 g/L CuSO$_4$, 10 g/L Na$_2$S$_2$O$_3$
Oxidation Potential 435, Voltage 18.8, Amperes 0.44 pH 5.0
Field Strength 4.7 v/cm. Temperature 25° C., Agitation used.
Rate of Gold Dissolution 0.02 mg/minute.

Example 13

A 2 mm diameter silver bead was used instead of a gold bead
Leach Solution - 20 g/L FeCl$_3$, 10 g/L (NH$_2$)$_2$ CS
Oxidation Potential 497, Voltage 16.8, Amperes 1.5, pH 1.5
Field Strength 4.2 v/cm. Temperature 25° C., Agitation used.
Rate of Silver Dissolution 0.10 mg/minute.

Example 14

Platinum Tests
Pt wire used 30 mm long, wt 0.21753 g
Soln 200 ml H$_2$O, 4 g FeCl$_3$, 2 g CS(NH$_2$)$_2$ ph
Oxidation Potential 550, Agitation used.
Rate of Dissolution without voltage applied 0.01 mg/minute
Rate of Dissolution with Field Strength 4.9 v/cm 0.13 mg/minute
Amperage 1.1 A

Example 15

The applicability of the process to ore samples was assessed. The ores assessed were:

(i) Grosmont high grade oxidized ore - this ore contains significant quantities of montmorillonite and bentonite clays and is of consequence highly viscous.

(ii) Sons of Gwalia Tailings - types 1, 4 and 5. These ores are derived from oxidized and unoxidized ores from the original Sons of Gwalia mine which finished production during the late 1950's. Analysis has indicated that approximately 40-50% of the gold in these tailings occurs in the form of a cuproauride, insoluble in all solvents.

(iii) Blackwood, Grace Egerton Reef - this is an unoxidized ore, high in sulphides and containing only 40-50% free gold.

The process of this invention requires fine free gold for efficient extraction. Consequently, it was not surprising that the best results were obtained on the Grosmont High Grade Ore.

An examination of the naturally occurring acidity of the ores defined the lixiviant/oxidant combination likely to be most economically viable. In the case of the above ores these were hypochlorite/sodium chloride and thiourea/ferric chloride. Table 1 summarizes the above testwork.

THIOUREA/FERRIC CHLORIDE TESTWORK

An extraction of 90% of cyanide available gold was achieved on Grosmont High Grade Ore. This extraction was achieved in 30 seconds as compared to the 12 hours necessary in the present cyanidation plant.

Thiourea testwork on the Sons of Gwalia ore types was discontinued as the large quantities of HCl needed to achieve the required pH would have made the process uneconomical.

The Blackwood ore thiourea testwork was discontinued as, although the pH could readily be brought to the required level, complete sulphurization of the thiourea occurred.

HYPOCHLORITE/SODIUM CHLORIDE TESTWORK

As with the thiourea testwork the best results with hypochlorite were obtained on the Grosmont High Grade Ore, and 62.4% of the cyanide soluble gold was obtained in 30 seconds. Extractions on the Sons of Gwalia ore types varied between 38% and 65% of cyanide soluble gold while only 22.6% of the gold available to cyanide in the Blackwood ore was extracted.

Testwork on the Bendigo Red Sands showed that better than cyanide extractions could be obtained with hypochlorite. Ores where the gold is partially locked in gangue minerals or sulphides will generally yield more gold to cyanide than to the other lixiviant/oxidant combinations when the electrochemical system is used.

TABLE 1

Summary Of Testwork Results For Thiourea And Hypochlorite On Ore Samples

| Name of Ore | Fire Assay Total Au gm/t | Cyanide Soluble Au gm/t | % Extract | Cell Tail Pulp Hypoch. Test | % Extract Hypoch. Test | % Extract Relat. To Cyanide | Cell Tail Pulp Thiourea Test | % Extract Thiourea Test | % Extract Relat. To Cyanide |
|---|---|---|---|---|---|---|---|---|---|
| Grosmont High Grade | 4.17 | 386 | 92.5 | 1.76 | 57.8 | 62.4 | 0.68 | 83.7 | 90.4 |
| Sons of Gwalia | | | | | | | | | |
| Type 1 | 1.0 | 0.4 | 40.0 | 0.74 | 26.0 | 65.0 | — | — | — |
| Type 4 | 1.01 | 0.49 | 48.5 | 0.82 | 19.0 | 38.7 | — | — | — |
| Type 5 | 1.53 | 1.14 | 74.5 | 1.09 | 28.7 | 38.5 | — | — | — |
| Blackwood 0173 | 6.96 | 3.53 | 50.7 | 6.16 | 11.4 | 22.6 | — | — | — |
| Bendigo Red Sands | — | — | 14 | — | 19/18 | >100 | — | — | — |

Example 16

Dichromate and hypochlorite solutions were examined to determine the effects of various oxidant/lixiviant concentrations, various applied voltages and cell agitation.

FIG. 1 illustrates the results of varying oxidant lixiviant combinations with constant oxidant concentration the rate of dissolution will reach a maximum at an optimum lixiviant concentration although the rate of dissolution does increase slowly with increasing oxidant concentration.

TABLE 2

The Effects Of Varying The Applied Voltage And Cell Agitation On The Rates Of Dissolution Of The Gold Bead

| | | | Rates of Dissolution | |
|---|---|---|---|---|
| Oxidant | lixiviant | Voltage | No Agitation | High Agitation |
| 0.1% Dichromate | 3% NaCl | 20 volts | 0.08 mg/min | 0.12 mg/min |
| 0.1% Dichromate | 3% NaCl | 40 volts | | 1.48 mg/min |
| 0.5% Dichromate | 3% NaCl | 20 volts | 0.14 mg/min | 0.28 mg/min |
| 0.5% Dichromate | 3% NaCl | 40 volts | 0.36 mg/min | 1.36 mg/min |
| 0.5% Dichromate | 5% NaCl | 20 volts | 0.08 mg/min | 1.12 mg/min |
| 0.5% Dichromate | 5% NaCl | 40 volts | 0.44 mg/min | |
| 1% Dichromate | 3% NaCl | | | 1.6 mg/min |
| 0.3% Hypochlorite | 2% NaCl | 20 volts | | 0.03 mg/min |
| 0.3% Hypochlorite | 2% NaCl | 40 volts | | 0.13 mg/min |
| 0.3% Hypochlorite | 4% NaCl | 20 volts | | 0.09 mg/min |
| 0.3% Hypochlorite | 4% NaCl | 40 volts | | 0.23 mg/min |

For particular oxidant/lixiviant combinations increasing the applied voltage to the cell resulted in significantly enhance dissolution rates. Similarly, high agitation in the cell significantly increased the rate of dissolution, at defined applied voltages and oxidant/lixiviant concentrations. The combined effect, of higher voltage and high agitation resulted in greatly enhanced rates of dissolution, a rate increase greater than that which could be attributed to the combination of the two variables alone.

Example 17

Further tests were carried out on gold beads with various oxidant/lixiviant combinations at varying pH and rates of dissolution were measured.

Figure 2:
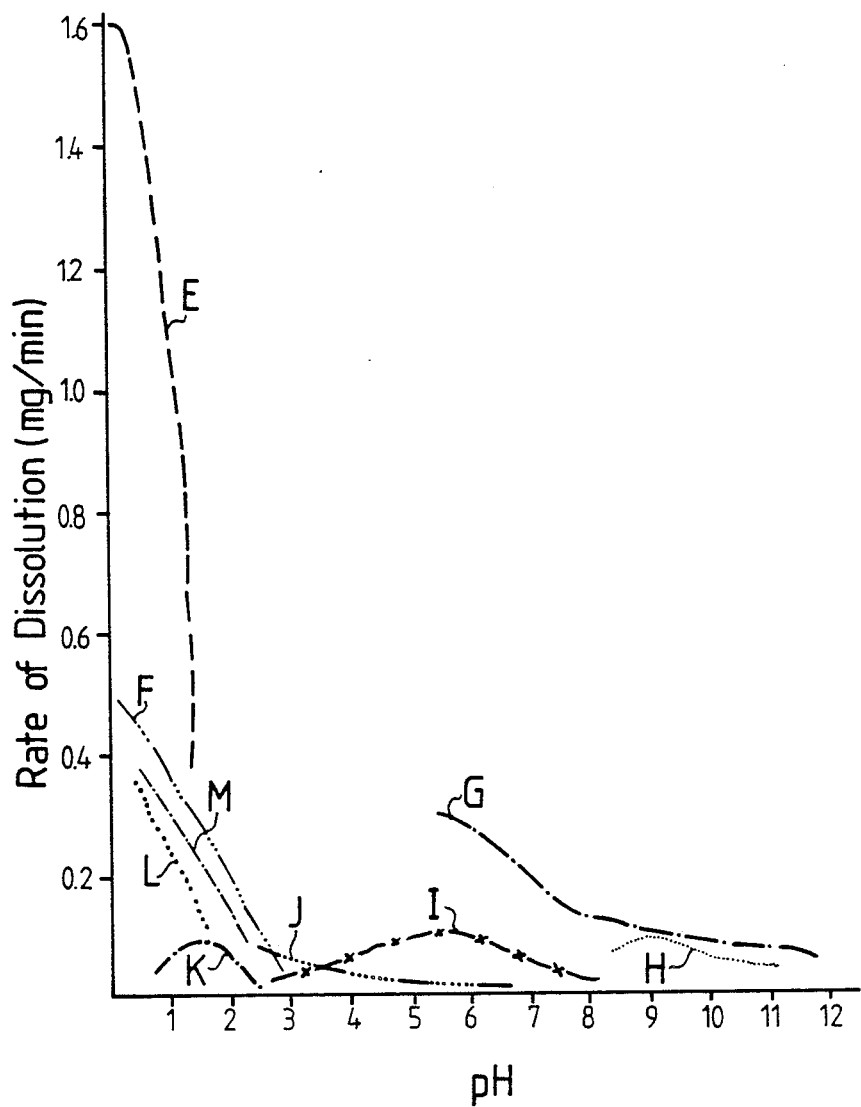
Figure 3:
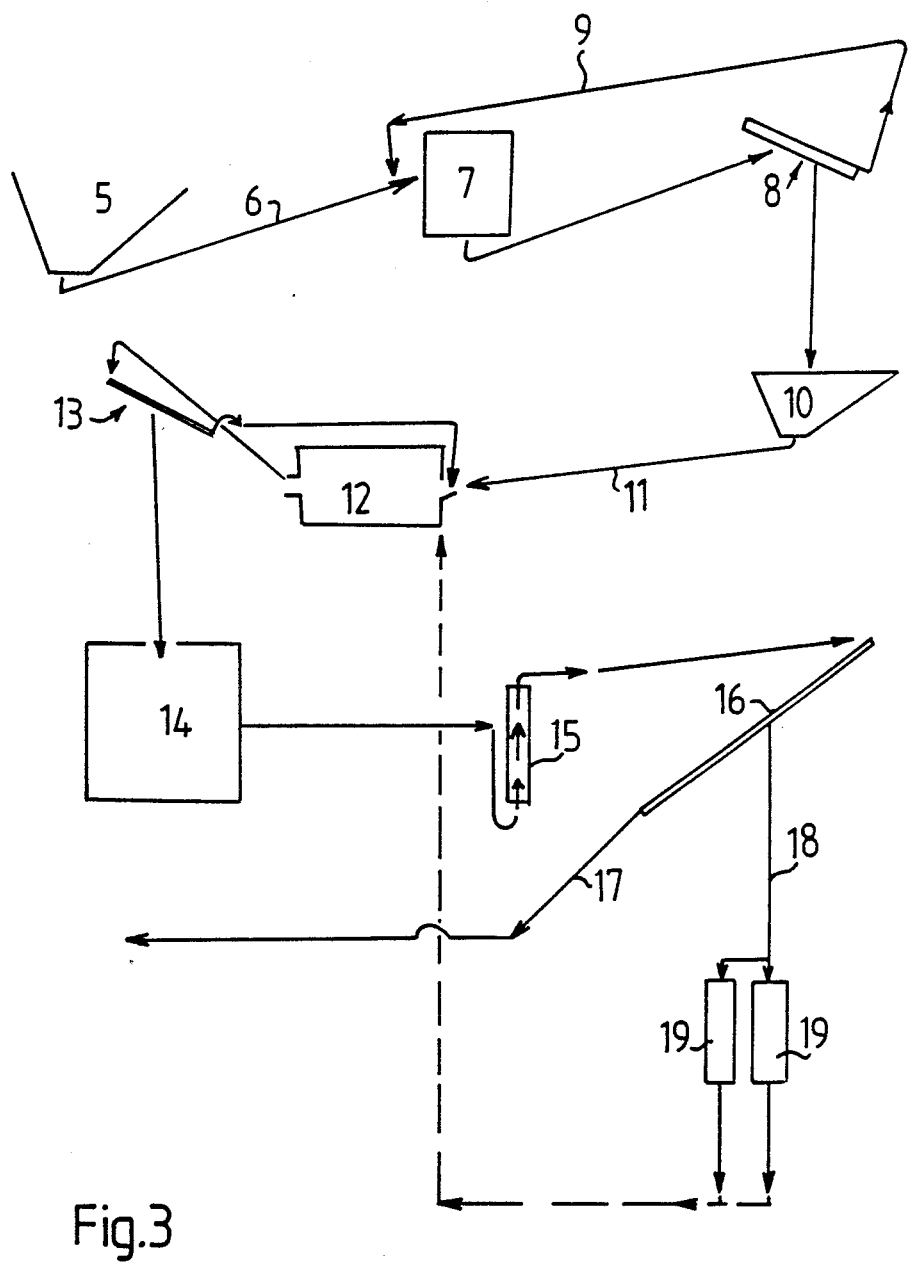
FIG. 3 is a flow chart of a processing plant utilizing the leaching process of this invention.

The results are shown in FIG. 2. FIG. 2 shows that for the range of commonly utilized pH conditions used in ore treatment an oxidant/lixiviant combination is available for use in the process of this invention. Additionally, rates of dissolution were significantly in excess of those apparent for the cyanide process, while each oxidant/lixiviant combination showed maximum dissolution rates within a particular pH range.

The majority of the oxidant/lixiviant combinations tested showed maximum rates of gold dissolution in acid conditions. However, hypochlorite and ammonial chloride oxidants in a brine solution achieved rates of dissolution up to 60 times faster than cyanide in pH conditions in excess of 7. It is noted that an increase of up to 90 times the dissolution rate (relative to cyanide) was achieved in this process where an ammonial salt was used as the oxidant in a cyanide solution.

These examples reveal that under a variety of conditions gold entering solution in an oxidized state does so at an accelerated rate under the electric field conditions of this invention.

The claims defining the invention are as follows:

1. A method for extracting a noble metal value present in an ore comprising:
   (a) adding to an aqueous slurry of ground ore containing said noble metal an oxidizing agent which is capable of oxidizing said noble metal and a lixiviant which is capable of forming a soluble complex with an oxidized form of the noble metal, said lixiviant and said oxidizing agent being present in an amount sufficient to solubilize the noble metal;
   (b) subjecting the slurry to which the oxidizing agent and lixiviant have been added to an alternating electric field having a field strength at least sufficient to increase the rate of dissolution of the noble metal; and
   (c) recovering noble metal in solution.

2. A method as claimed in claim 5 wherein the noble metal is gold, platinum, or silver.

3. A method as claimed in claim 2 wherein the noble metal is gold and the lixiviant is thiourea or sodium chloride and the oxidizing agent is sodium hypochlorite or ferric chloride.

4. A method as claimed in claim 1 wherein the electric field strength is at least 1 volt per centimeter, the oxidizing agent concentration is at least 0.1% by weight of the slurry and the lixiviant concentration is at least 0.1% by weight of the slurry.

5. The method of claim 1 wherein the lixiviant is the source of a complexing anion.

6. The method of claim 1 wherein the lixiviant is a ligand.

7. The method according to claim 1, 5, or 6 wherein the oxidizing agent is sodium hypochlorite, ammonium chloride, ferric chloride, ammonium hydroxide, copper sulphate, or ferric ammonium citrate.

8. The method according to claim 1 wherein the lixiviant is sodium chloride, ammonium chloride, ammonium thiocyanate, sodium cyanide, sodium thiosulfate, thiourea, or ferric ammonium citrate.

9. The method of claim 1 wherein the field strength is at least 1 volt/cm.

10. The method according to claim 1, 5, 6 or 8 wherein the pH of the slurry is about neutral.

11. The method of claim 1 wherein the frequency of the alternating electric field is about 3 cycles/sec.

12. The method of claim 1 including agitating the slurry to further increase the rate of dissolution of the noble metal.

13. The method according to claim 7 wherein the lixiviant is sodium chloride, ammonium chloride, ammonium thiocyanate, sodium cyanide, sodium thiosulfate, thiourea, or ferric ammonium citrate.

14. A method for extracting a noble metal value present in an ore comprising:
   (a) adding to an aqueous slurry of ground ore containing said noble metal an oxidizing agent which is capable of oxidizing said noble metal and a lixiviant which is capable of forming a soluble complex with an oxidized form of the noble metal, said lixiviant and said oxidizing agent being present in an amount sufficient to solubilize the noble metal, the amount of each of said lixiviant and oxidizing agent being at least 0.1% by weight of the slurry;
   (b) subjecting the slurry to which the oxidizing agent and lixiviant have been added to an alternating electric field having a field strength at least sufficient to increase the rate of dissolution of the noble metal, said field strength being at least 1 volt per centimeter and the frequency of said field being at least 3 cycles per second; and
   (c) recovering the noble metal in solution.

15. The method according to claim 14 wherein the amount of each of said lixiviant and said oxidizing agent is at least 1% by weight of the slurry.

16. The method according to claim 14 or 15 wherein the oxidizing agent is sodium hypochlorite, ammonium chloride, ferric chloride, ammonium hydroxide, copper sulphate, or ferric ammonium citrate and the lixiviant is sodium chloride, ammonium thiocyanate, sodium cyanide, sodium thiosulfate, or thiourea.

17. The method according to claim 16 wherein said oxidizing agent is ammonium chloride or ferric ammonium citrate which functions also as said lixiviant.

18. The method according to claim 16 including agitating the slurry to further increase the rate of dissolution of the noble metal.

19. The method according to claim 18 wherein the noble metal is gold, platinum, or silver.

20. In a process wherein gold is extracted from a ground gold-containing ore by forming an electrically conductive, aqueous slurry thereof and passing therethrough an alternating electric current as the slurry is agitated thereby effecting release of gold from said ore into solution form in the aqueous phase of said slurry, and thereafter recovering gold from said solution, the improvement comprising increasing the rate of release of gold from the ore into solution form by including in the electrically conductive aqueous slurry an oxidizing agent which is capable of oxidizing gold and a lixiviant which is capable of forming a soluble complex with the oxidized form of gold, the amount of each of said lixiviant and oxidizing agent being at least 0.1% by weight of the slurry, and wherein the strength of the field produced by the alternating electric current is at least 1 volt per centimeter and the frequency of the field is at least 3 cycles per second.

21. The method according to claim 1, 14 or 20 including separating aqueous solution in which the noble metal is dissolved from the ore, and thereafter recovering noble metal in solution.

22. A method according to claim 1, 14 or 20 wherein the lixiviant is sodium chloride, sodium thiosulphate, or thiourea.

* * * * *